Nov. 24, 1936.  A. T. BREMSER  2,061,826

INTERNAL COMBUSTION ENGINE

Filed Jan. 28, 1935  3 Sheets—Sheet 1

INVENTOR.
Albert T. Bremser.

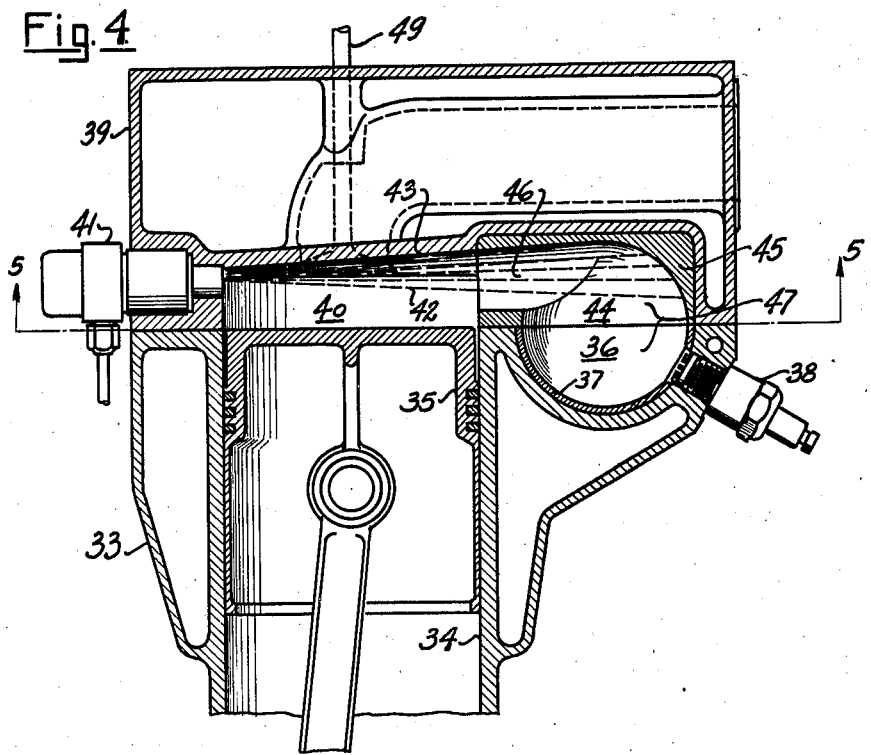
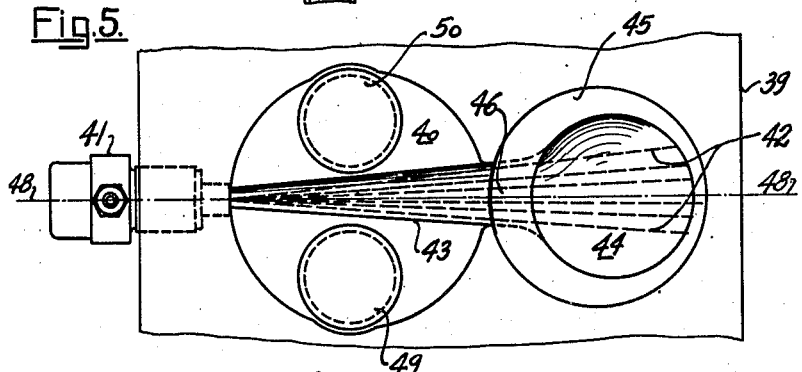
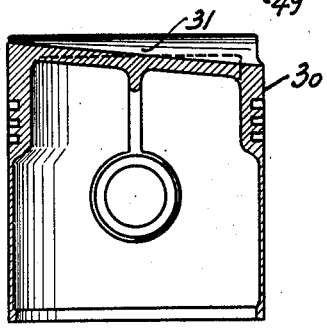
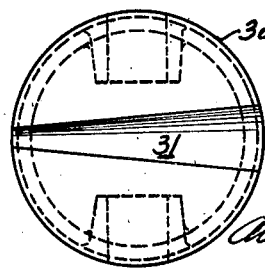

INVENTOR:
Albert T. Bremser

Patented Nov. 24, 1936

2,061,826

UNITED STATES PATENT OFFICE 2,061,826

INTERNAL COMBUSTION ENGINE

Albert T. Bremser, Westmont, N. J.

Application January 28, 1935, Serial No. 3,792

19 Claims. (Cl. 123—32)

This application is filed to replace in part my co-pending application Serial #672,485, filed May 23, 1933. It further shows and describes in detail variations of constructions, the subject matter of which is broadly claimed in the above copending application.

The present invention relates to internal combustion engines of the F-head and "valve-in-head" construction in which liquid fuel is injected preferably during the last part of the compression stroke. One type of construction discloses low compression engines in which the fuel is ignited by electrical ignition means such as usual sprak plugs which receive electrical energy at timed moments or intervals of the engine cycle from a battery or magneto, and in which the injection of fuel must be terminated before the engine piston reaches the upper dead center position. The other type of construction permits the fuel injection period to begin during the compression stroke and to extend into the expansion stroke of the piston, and if the compression ratio of the engine is made sufficiently high to facilitate self-ignition of the fuel charge, can be operated as a compression-ignition engine.

One object of the present invention is to provide an engine construction which permits the formation of a localized combustible fuel-air mixture at part load of the engine. Another object is to provide an engine construction which does not impose limitations as to the desirable time of the engine cycle during which the fuel may be injected. A still further object is to provide a so-called low compression engine with timed ignition which permits a very high compression ratio even if fuels, which cause objectionable detonation in high compression carburetor engines, are used. The compression ratio can be so high that fuels such as butane and propane may be used most advantageously without necessitating structural changes of the combustion chamber.

In the accompanying drawings various forms of engine constructions employing my combustion chamber are illustrated, those parts of the engines which are not necessary for the understanding of the invention, being omitted.

In the drawings:

Figure 4 is a sectional elevation of the upper end of the cylinder block, the cylinder head and the piston of a "valve-in-head" engine employing substantially the same geometric form of the combustion chamber illustrated in Figure 1.

Figure 5 is a plan view of the underside of the cylinder head shown in Figure 4, as indicated by arrows 5—5 of Figure 4.

Figure 6 illustrates an engine piston with a modified design of the piston top and which is designed to replace the engine pistons shown in Figures 1, 3 and 4.

Figure 7 shows a plan view of the top of the piston shown in Figure 6.

Figure 1:
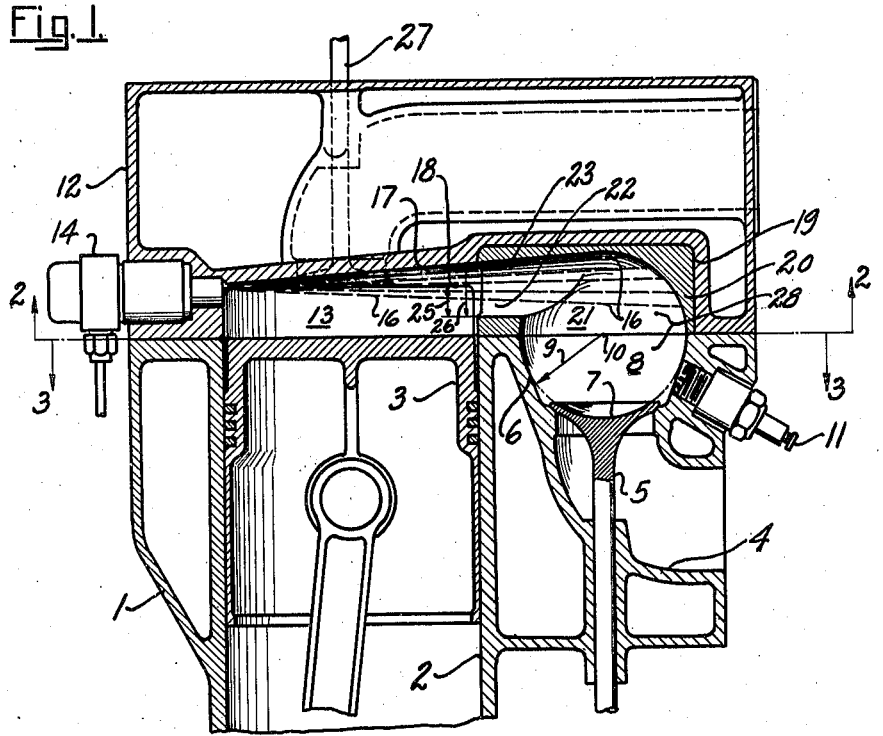
Figure 1 is a sectional elevation of the upper end of the cylinder block, the piston and the cylinder head of an F-head engine employing my combustion chamber.
Figure 2:
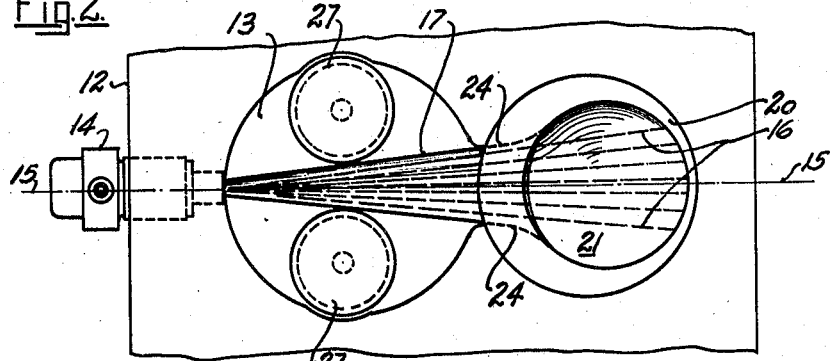
Figure 2 is a plan view of the underside of the cylinder head shown in Figure 1, as indicated by arrows 2—2 of Figure 1.

In Figure 1 numeral 1 indicates a cylinder block, having an engine cylinder bore 2 in which the piston 3 reciprocates. Also formed integral with the cylinder block 1 is a port 4 which at one end is intermittently closed by a valve 5. The wall 6 is formed as a continuation of the wall forming the port 4. The valve disk 7 forms together with the wall 6 a substantially hemispherical cavity 8, generated with the radius 9 about the theoretical center 10. A usual spark plug 11 is inserted into the wall 6. The valve 5 is opened and closed in the usual manner by a camshaft, tappet and spring not shown and it is preferably used as intake valve. It may, if desired, be used as outlet or exhaust valve. A cylinder head 12 has a cylindrical cavity 13 formed as a continuation of the cylinder bore 2 and is designed to receive the head of the piston 3, with the smallest possible mechanical clearance when the piston is in its upper dead center position. A usual fuel injection valve 14 is mounted in the cylinder head 12 and it projects through the side of cavity 13 preferably in a manner so that the center line of injection valve 14, the center line of the cylinder bore 2, the center 10, and the spark plug 11 fall within a common plane indicated by line 15—15 in Figures 2 and 3. A cone-shaped fuel jet 16, indicated as a bundle of short lines, is injected across cavity 13 when the injection valve 14 is actuated. The channel 17 is formed in the wall 18 of cavity 13. The wall 18 is the preferable flat and circular end wall of cavity 13. Channel 17 is shaped to fit the shape of the fuel jet 16 closely but permits unobstructed travel of the fuel jet. A second cavity 19 in the cylinder head adapts the insert 20 which has a cavity 21 formed as a hemisphere and as a continuation of cavity 8. A passage 22 connects the cavity 21 with the cavity 13 and the upper wall 23 of this passage is a continuation of the wall forming the channel 17. The side walls 24 are preferably curved and meet the walls of cavity 21 tangentially as illustrated in Figure 2. The passage 22 is preferably Venturi-shaped and its cross sectional area is sufficient to permit unobstructed transfer of gases and fuel. When the piston 3 is in the upper dead center position it cuts off the portion indicated by 25 of the total height 26 of passage 22. Usual valves 27, which preferably serve as exhaust valves open into the cavity 13 and are actuated in a conventional manner not indicated. The cavities 8 and 21 will be referred to as combustion chamber 28.

The operation of the engine is as follows:

The engine is operated according to the four stroke cycle principle. During the suction stroke an air charge is drawn into the engine cylinder and combustion chamber and this air charge is compressed during the following upstroke of the piston. The greater part of the portion of the air charge contained in the engine cylinder is transferred into the combustion chamber through passage 22 and rotates in the chamber, entering it tangentially. The air velocity through passage 22 and the velocity of rotation in chamber 28 are functions of the rate at which the air is transferred from the cylinder into the chamber. The rate of transfer of the air is a function of the cross sectional area of passage 22 and of the piston velocity. When the piston progressively cuts off the passage 22 the effective transfer area of the passage is progressively reduced and thereby a high air velocity is sustained also during the last part of the compression stroke, despite the reduced piston velocity. At the end of the compression stroke the greater portion of the air charge is contained in the combustion chamber 28 and passage 22, while a comparatively small portion remains in channel 17 and in the shallow mechanical clearance space between the piston head and the walls of cavity 13.

Beginning preferably at approximately 60 degrees before top dead center position of the piston, a predetermined quantity of fuel in proportion to load demands on the engine, is delivered by a usual fuel injection pump, not shown, to the fuel injection valve 14 and is atomized by that valve and sprayed in the form of a conical jet 16 at high velocity across the cavity 13 through passage 22 into the chamber 28. The fuel jet is deflected about the walls of the chamber and since the fuel jet 16 and spark plug 11 are in one plane 15—15 of Figures 2 and 3, the fuel jet will pass across the electrodes of the spark plug. The fuel will, while traveling across cavity 13 and when passing through the Venturi-shaped passage 22 mix with air in a very similar manner as fuel and air are mixed in the venturi of a usual carburetor. At part load the fuel jet has such a length and diameter that it will mix only with a portion of the total air charge and the quantities of fuel and air, which are mixed, are proportioned, so that the fuel-air mixture is combustible. When this combustible fuel-air mixture passes across the spark plug, ignition occurs. The time of fuel injection and the time of ignition are interrelated so that ignition occurs when the fuel-air mixture is in the vicinity of the spark plug. The fuel enters the chamber 28 in substantially the same direction as the air and both air and fuel rotate in substantially the same direction so that the tendency of the fuel diffusing throughout the entire air charge in the chamber at part load is materially reduced. In other words, at part load condition of the engine a localized fuel-air cloud is maintained in the chamber, at least until ignition occurs. The sustained high air velocity may give added centrifugal pressure to the fuel cloud in the chamber and will then cause spreading of the fuel cloud about a great portion of the chamber wall. From the drawings it is evident that the fuel injection period should preferably terminate when the edge of the piston near the passage 22 touches the fuel jet. This moment of the engine cycle is approximately 30 degrees before top dead center position of the piston. Ignition may occur as early as 30 degrees before top dead center position of the piston, depending largely on the engine speed. The charge formation described is substantially the same as claimed broadly in my copending application Serial #672,485. The insert 20 is preferably not cooled, which will expedite vaporization of the liquid fuel. Cavity 21 and passage 22 may, if desired, be formed directly in the head 12, thus eliminating the insert 20.

The engine piston 3 may be replaced by the piston 30 illustrated in Figures 6 and 7. While the top of the piston 3 is preferably flat, the top of piston 30 is provided with a channel 31, which, with this piston in its upper dead center position, will form together with the channel 17 in cylinder head 12 a cone-shaped clearance space, dimensioned to fit closely around the fuel jet 16. It is evident that if piston 30 replaces piston 3 in the engine shown in Figure 1 it is possible to begin fuel injection at a later point of the compression stroke and extend the injection period into the following downstroke. This may in some cases be desirable. Ignition may begin before the injection period is completed. At full load condition of the engine the combustible mixture may fill chamber 28, passage 22 and channels 17 and 31, so that practically all of the air is mixed with fuel. It is also evident that, if an engine of the construction just described is dimensioned to provide a compression ratio sufficiently high to facilitate self-ignition of the fuel charge, it can be operated as a compression ignition engine in which the fuel injection period usually extends into the downstroke following the compression stroke. In that case the spark plug may be used to facilitate starting or it may be replaced by a usual starting heater plug.

Figure 3:
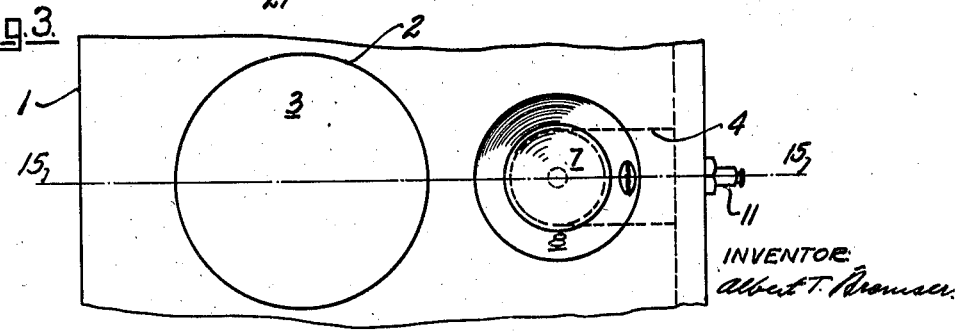
Figure 3 is a plan view of the cylinder block with the piston inserted as indicated by arrows 3—3 of Figure 1.

The engine illustrated in Figures 4 and 5 is of the valve-in-head type but the combination of fuel injection valve, cylinder bore, passage, combustion chamber and spark plug is substantially the same as that shown in Figures 1 to 3.

The cylinder block 33 has a cylinder bore 34. A piston 35 having preferably a flat top is inserted in cylinder bore 34 and is reciprocated in the usual manner. In the drawings the piston is shown in a position corresponding to about 35 degrees before top dead center position. A hemispherical cavity 36, having a liner 37 is formed in the top of cylinder block 33 and a usual spark plug 38 protrudes through the wall of the block and the liner 37 into the cavity 36. A cylinder head 39 attaches to the top of the cylinder block 33. It has a cavity 40 formed as a continuation of the cylinder bore 34 and this cavity is sufficiently deep so that a usual fuel injection valve 41 can be inserted through the cylindrical sidewall thereof. The fuel injection valve 41 is positioned to direct a conical fuel jet 42 across the cavity 40. A semi-cone-shaped channel 43 provides clearance for the fuel jet 42 and is identical with channel 17 of Figures 1 and 2. The hemispherical cavity 44 in the insert 45 is a continuation of the cavity 36. Cavities 36 and 44 will be referred to as combustion chamber 47. A tangential passage 46, formed partly as a continuation of channel 43, connects the cylinder and cavity 40 with the combustion chamber 47. The injection valve 41, the fuel jet 42, the passage 46, the center of the spherical chamber 47 and the spark plug 38 are preferably in one plane 48—48 of Figure 5. A usual inlet valve 49 and exhaust valve 50 are mounted in the cylinder head 39 and serve the usual purpose. The charge formation and combustion in this engine is the same as that described for the engine shown in Figures 1 to 3. The piston 35 may be replaced by piston 30 so that channels 31 and 43 will form a coneshaped clearance space for the fuel jet 42, when the piston is in the upper dead center position. Replacement of piston 35 by piston 30 serves the same purpose as explained for the engine shown in Figures 1 to 3.

In the engine shown in Figures 1 and 4 the fuel spray nozzles 14 and 41 respectively are positioned so that the fuel jets have to travel across the entire cylinder diameter before reaching the passages 22 and 46 respectively. A certain length of time is required by the fuel to mix with air thoroughly and to absorb heat from the air in order to be readily ignitible when it passes the spark plug and when a spark occurs thereon. The distance which the fuel has to travel from the spray nozzle to the spark plug and the temperature of the air which mixes with fuel are important considerations. It is evident, that if the distance between the spray nozzle and the spark plug is relatively short, or in other words, if the time during which the fuel can absorb heat from the air, preparatory to ignition, is short, the air temperature must be relatively higher in order to heat the fuel to the same temperature as it will attain when traveling a longer distance, or during a longer time interval through air of lower temperature. From the drawings it is evident that in the engines shown in Figures 1 and 4 the longest possible distance between the fuel spray nozzle and the spark plug is obtained by placing the spray nozzle diametrically opposite the passages 22 and 46 respectively.

Figure 8:
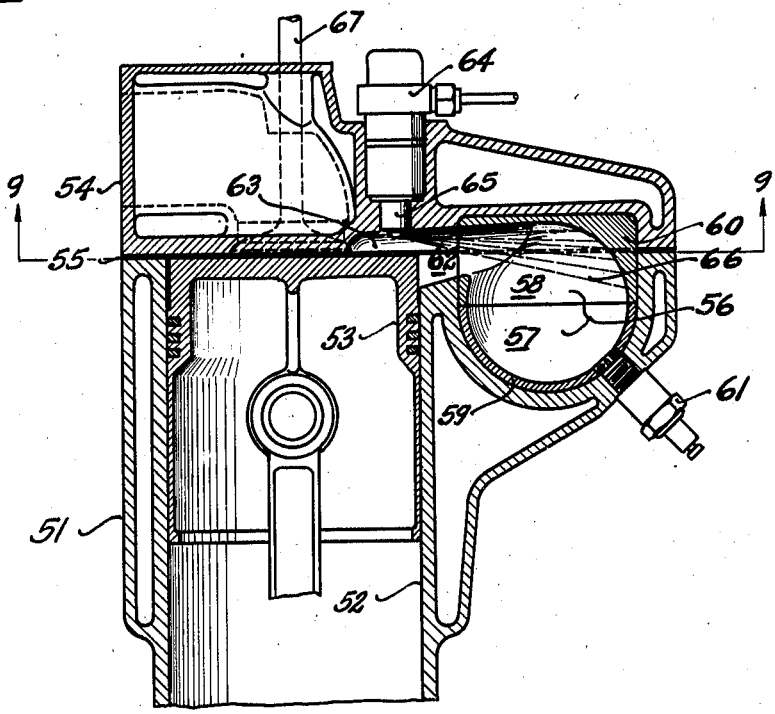
Figure 8 is a sectional elevation of the upper end of the cylinder block, the cylinder head and the piston of an engine employing substantially the same geometric form of the combustion chambers shown in Figures 1 and 4 but in which the spray nozzle is located differently from that shown in Figures 1 and 4.
Figure 9:
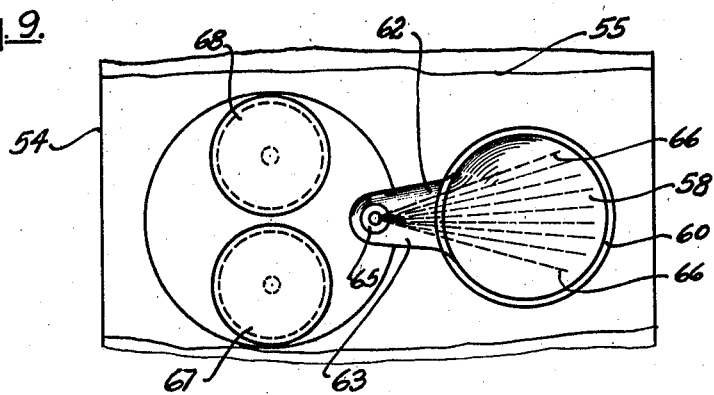
Figure 9 is a plan view of the under side of the cylinder head of the engine shown in Figure 8, as indicated by arrows 9—9 in Figure 8. The insert forming the upper half of the chamber is inserted in the head and the cylinder head gasket is attached to the under side of the head to show the perimeter of the cylinder bore in relation to the cavity 58.

Figures 8 and 9 show an engine having substantially the same arrangement of combustion chamber, cylinder and interconnecting passage as shown in Figures 1 to 5, but in Figures 8 and 9 the fuel spray nozzle 65 is placed closely adjacent the interconnecting passage. In Figure 8 a cylinder block 51 has a cylinder bore 52 and a piston 53 arranged to reciprocate therein in the usual manner. The piston 53 is shown in its upper dead center position in which the top of the piston approaches the flat portion of the cylinder head closely. Cylinder head 54 covers the cylinder bore 52. A usual gasket 55 is placed between the top of cylinder block 51 and the bottom face of cylinder head 54. The substantially spherical combustion chamber 56 consists of two cavities 57 and 58 formed preferably by inserts 59 and 60. Insert 59 is mounted entirely in the cylinder block 51, whereas insert 60 is held in the latter and in the cylinder head 54. A usual spark plug 61 projects into cavity 57. A mixing passage 62 arranged tangentially with respect to cavity 58 interconnects the cylinder bore 52 and the combustion chamber 56 and it is formed partly in the top of the cylinder block 51 and partly in the bottom of cylinder head 54. The upper portion of passage 62 extends partly over the cylinder bore 52 forming a cavity 63. The usual spray nozzle 64, mounted in the cylinder head, projects into cavity 63 and the nozzle tip 65 has one or more spray orifices arranged to direct a fuel jet 66 through the passage into the combustion chamber 56. This fuel jet 66 enters the chamber 56 tangentially or nearly tangentially so that the fuel droplets will be deflected about the chamber walls in the same general direction by their own kinetic energy. The air enters the chamber 56 during the compression stroke of piston 53 in the same general direction as the fuel jet 66. Both fuel and air are forcibly delivered to the combustion chamber. Usual inlet and outlet valves 67 and 68 are arranged in the cylinder head 54.

In the engine just described the formation of a combustible fuel-air mixture takes place in substantially the same manner as described for the engine shown in Figure 1. It will be noted that in Figure 8 the fuel spray nozzle 64 is mounted closer to the spark plug 61 than the nozzle 14 of Figure 1 to the spark plug 11. Considering the interrelation of the duration of contact of the fuel with heated air and the temperature of that air, as explained above, it is evident, that the engine shown in Figures 8 and 9 permits a higher air temperature, in other words, a higher compression ratio than the engine shown in Figure 1.

Furthermore, the fuel injection period in the engine of Figures 8 and 9 may extend over the top center position of the piston into the following down stroke. This engine may therefore be operated as a compression ignition engine, provided, that a sufficiently high compression ratio is used to obtain self-ignition of the fuel charge.

From the drawings it is evident that the three engine constructions shown have substantially the same general arrangement of combustion chamber, mixing passage, cylinder and spray nozzle as broadly claimed in my copending application Serial #672,485 filed May 23rd, 1933.

The location of the spark plugs 11, 38 and 61 is not limited to the positions shown in the drawings. These positions are preferred, but the plugs may be located at any suitable point of the combustion chamber which is contacted by the fuel cloud at all load conditions of the engine. It is obvious that the spark plugs may also be located at the mixing passage.

Having thus fully described my said invention, what I claim as new and desire to secure by Letters Patent, is:

1. An internal combustion engine comprising a cylinder block containing a piston and a valve, a cylinder head having two cavities, the first of the two cavities formed as a continuation of said cylinder, the second cavity formed about said valve, and forming together with said cylinder block a combustion chamber with curved peripheral wall, a passage between said first cavity and said second cavity, said passage being arranged tangentially with respect to said second cavity, a valve in said head opening into said first cavity, a fuel nozzle adjacent said first cavity and substantially opposite said passage and artificial ignition means in said combustion chamber.

2. An internal combustion engine employing fuel injection and timed ignition, comprising a cylinder block having a piston in a cylinder bore and a valve in a cavity, a cylinder head having two cavities with curved peripheral walls, the first of the two cavities formed as a continuation of said cylinder, the second cavity formed above said valve as a continuation of said valve cavity, a passage between said first cavity, and said second cavity, said passage being arranged tangentially with respect to said second cavity, valves in said head opening into said first cavity, a fuel nozzle adjacent said first cavity and substantially opposite said passage and artificial ignition means in said second cavity.

3. An internal combustion engine, comprising a cylinder block having a cylinder bore with a piston therein and a substantially hemispherical cavity laterally disposed with respect to said cylinder, a cylinder head having two cavities, the first one of the two cavities formed as a continuation of said cylinder and adapted to receive said piston during the end of the upstroke, the second cavity formed as a hemisphere and as a continuation of said cavity in said cylinder block, a passage between said first cavity and said second cavity, formed entirely in said cylinder head, said passage being arranged tangentially with respect to said second cavity and having one face continuous with the upper face of said first cavity.

4. In an internal combustion engine having an engine cylinder forming together with the piston and the cylinder head a chamber of variable volume, means for forming and burning a combustible fuel charge comprising a fuel nozzle in said cylinder head positioned to project a fuel jet across or partly across said variable volume chamber, a cavity in said head above said cylinder forming a clearance channel for said fuel jet, a mixing passage laterally adjacent said channel and the upper end of said chamber, a combustion chamber of substantially spherical shape adjacent said passage and the latter having one face continuous with the wall forming said channel and with the wall forming said combustion chamber, artificial ignition means in said combustion chamber, and said fuel nozzle arranged to direct said fuel jet into said combustion chamber.

5. In an internal combustion engine having an engine cylinder forming together with the piston and the cylinder head a chamber of variable volume, means for forming and burning a combustible fuel charge comprising a fuel nozzle in said cylinder head positioned to project a fuel jet across or partly across said variable volume chamber, a cavity in said head above said cylinder forming a clearance channel for said fuel jet, a mixing passage laterally adjacent said channel and the upper end of said chamber, a combustion chamber of substantially spherical shape adjacent said passage and the latter having one face continuous with the wall forming said channel and with the wall forming said combustion chamber, artificial ignition means in said combustion chamber, and said fuel nozzle, said fuel jet emerging therefrom, said clearance channel, said passage and said chamber arranged substantially symmetrically about a plane passing through the vertical centerline of said cylinder.

6. In an internal combustion engine having an engine cylinder forming together with the piston and the cylinder head a chamber of variable volume, means for forming and burning a combustible fuel charge comprising a fuel nozzle in said cylinder head positioned to project a fuel jet across or partly across said variable volume chamber, a cavity in said head above said cylinder forming a clearance channel for said fuel jet, a mixing passage laterally adjacent said channel and the upper end of said chamber, a combustion chamber of substantially spherical shape adjacent said passage and the latter having one face continuous with the wall forming said channel and with the wall forming said combustion chamber, artificial ignition means in said combustion chamber arranged substantially in line with said passage and said fuel nozzle, said piston adapted to decrease the effective transfer area of said passage during the last part of the upstroke, and said fuel nozzle arranged to direct said fuel jet into said combustion chamber substantially tangentially, whereby said fuel jet will be deflected about the wall of said combustion chamber and past said ignition means.

7. An internal combustion engine comprising a cylinder block having a cylinder bore and a piston reciprocating therein, a cylinder head, a cavity in said head formed longitudinally continuous with said cylinder bore and receiving the upper portion of said piston during the last part of the compression stroke, a combustion chamber formed partly in the upper face of said cylinder block and partly in the underside of said cylinder head and being laterally disposed with respect to the upper end of said cylinder bore and said cavity, a passage formed in said head to communicate between said cavity and said chamber, and said passage arranged to have one face continuous with the wall forming said chamber, a fuel nozzle in said head, said nozzle having an orifice directed towards said passage, a clearance channel for the fuel jet emerging from said orifice formed in the end wall of said cavity as a continuation of said passage, artificial ignition means in said chamber, valves in said head opening into said cavity and a valve in said chamber opening thereinto and located in said cylinder block.

8. An internal combustion engine comprising a cylinder block having a cylinder bore and a piston reciprocating therein, a cylinder head, a cavity in said head formed longitudinally continuous with said cylinder bore and receiving the upper portion of said piston during the last part of the compression stroke, a combustion chamber formed as a body of revolution partly in the upper end of said cylinder block and partly in the underside of said cylinder head and laterally disposed with respect to said cylinder bore and said cavity, a passage between said cavity and said chamber arranged tangentially with respect to said chamber and formed entirely in said head, a fuel nozzle in said head, said nozzle having an orifice directed towards said passage, a clearance channel for the fuel jet emerging from said orifice formed in the end face of said cavity as a continuation of said passage, artificial ignition means in said chamber, valves in said head opening into said cavity and a valve in said chamber opening thereinto and located in said cylinder block.

9. An engine as claimed in claim 8 further characterized by the feature that the cross-sectional area of said passage is substantially equal to the greatest area of port opening provided by said valve arranged in said cylinder block, when said valve is operated.

10. An engine as claimed in claim 8 further characterized by the feature that fuel sprayed from said nozzle will be sprayed across at least part of said cylinder through said passage into said chamber and will be deflected about the walls of said chamber, and said ignition means positioned in line with said passage and said fuel nozzle and in the path of said fuel jet.

11. An engine as claimed in claim 8 further characterized by the feature that the inner face of the valve disk of said valve located in said cylinder block and the walls forming the combustion chamber are uniformly curved to form a substantially spherical chamber.

12. In an internal combustion engine having a cylinder block, means forming an engine cylinder extending therethrough, means forming a piston arranged to reciprocate in said cylinder, means forming a cavity in said block entirely away from said cylinder, said cavity being formed as a body of revolution about an axis parallel to the axis of said cylinder, valve means providing an opening into said cavity, a cylinder head extending over said cylinder bore and said cavity, walls in said head forming a cylindrical cavity continuous with said cylinder bore, means forming a hemispherical cavity continuous with said cavity in said block and a passage arranged tangentially with respect to said hemispherical cavity, said passage communicating with said cylindrical cavity, walls forming a channel laterally continuous with the tangential face of said passage and extending diametrically across the flat end wall of said cylindrical cavity, said end wall being normal to the axis of said cylinder, a spray nozzle at the end of said channel opposite said passage, artificial ignition means in said valve cavity and valves in said head opening towards said piston.

13. An engine as claimed in claim 12 further characterized by the feature that said hemispherical cavity, said passage and said channel are formed symmetrically about the plane passing through said axis of said cylinder and of said cavity in said cylinder block.

14. An engine as claimed in claim 12, in which said piston has a flat end face normal to the axis of said cylinder.

15. An engine as claimed in claim 12, in which said piston is provided with an end face being partly flat and having a half cone-shaped channel extending diametrically across, and said channel being arranged opposite the channel formed in said cylinder head.

16. In an internal combustion engine, a cylinder block having a cylinder bore extending therethrough, a cylinder head having a cavity formed continuous with said cylinder bore, said cavity having an inner face substantially normal to the axis of said cylinder bore, a piston operating in said cylinder bore, a channel formed in said inner face, extending substantially diametrically across said inner face, walls forming a spherical chamber closely adjacent to said cavity and formed partly in said cylinder block and partly in said cylinder head, walls forming a passageway extending and communicating between said cavity and said spherical chamber, the passageway having one face laterally continuous with said channel and tangential to the curved face of the spherical chamber.

17. In an internal combustion engine, a cylinder block having a cylinder bore extending therethrough, a cylinder head having a cavity formed continuous with said cylinder bore, said cavity having an inner face substantially normal to the axis of said cylinder bore, a piston operating in said cylinder bore, a channel formed in said inner face, extending substantially diametrically across said inner face, walls forming a spherical chamber closely adjacent to said cavity and formed partly in said cylinder block and partly in said cylinder head, walls forming a passageway extending and communicating between said cavity and said spherical chamber, the passageway having one face laterally continuous with said channel and tangential to the curved face of the spherical chamber, a fuel nozzle at the end of said channel opposite said passageway positioned to project a spray of fuel through said passageway into said chamber, inlet and outlet valves in said head opening into said cavity and artificial ignition means in said spherical chamber.

18. In an internal combustion engine, a cylinder block having a cylinder bore extending therethrough, a cylinder head having an inner face extending across one end of said cylinder bore, a piston operating in said cylinder bore, walls forming a spherical chamber closely adjacent to the upper end of said cylinder bore and laterally disposed with respect to the latter, walls forming a mixing passage communicating between said chamber and said cylinder bore, said passage having an upper face substantially parallel to said inner face of the cylinder head and tangential to the wall of said spherical chamber, a cavity formed in the inner face of said cylinder head as a continuation of said upper face of the mixing passage, said cavity extending partly across said cylinder and a fuel nozzle positioned in said cavity opposite said mixing passage.

19. In an internal combustion engine, a cylinder block having a cylinder bore extending therethrough, a cylinder head having an inner face extending across one end of said cylinder bore, a piston operating in said cylinder bore, walls forming a spherical chamber closely adjacent to the upper end of said cylinder bore, and laterally disposed with respect to the latter, walls forming a mixing passage communicating between said chamber and said cylinder bore, said passage having an upper face substantially parallel to said inner face of the cylinder head and tangential to the wall of said spherical chamber, a cavity formed in the inner face of said cylinder head as a continuation of said upper face of the mixing passage, said cavity extending partly across said cylinder and a fuel nozzle positioned in said cavity opposite said mixing passage, whereby fuel sprayed from said nozzle will be sprayed through said mixing passage and will enter said chamber substantially tangentially and will be deflected about the walls of said chamber, artificial ignition means located in said chamber in the path of said fuel spray, said piston adapted to approach the flat portion of said inner face of the cylinder head closely and to reduce the effective transfer area of said passageway during the last part of the upstroke, and inlet and outlet valves arranged in said head.

ALBERT T. BREMSER.